United States Patent
Nishida (10) Patent No.: US 12,015,979 B2
(45) Date of Patent: Jun. 18, 2024

(54) ELECTRONIC APPARATUS, COMMUNICATION SYSTEM, AND COMMUNICATION METHOD

(71) Applicant: SEIKO EPSON CORPORATION, Tokyo (JP)

(72) Inventor: Kota Nishida, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 267 days.

(21) Appl. No.: 17/211,301

(22) Filed: Mar. 24, 2021

(65) Prior Publication Data

US 2021/0306944 A1 Sep. 30, 2021

(30) Foreign Application Priority Data

Mar. 27, 2020 (JP) ................................. 2020-056950

(51) Int. Cl.
- *H04W 48/20* (2009.01)
- *G06F 3/12* (2006.01)
- *H04W 40/24* (2009.01)
- *H04W 48/18* (2009.01)
- *H04W 84/12* (2009.01)

(52) U.S. Cl.
CPC .......... *H04W 48/20* (2013.01); *G06F 3/1203* (2013.01); *G06F 3/1236* (2013.01); *G06F 3/1292* (2013.01); *H04W 40/246* (2013.01); *H04W 48/18* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,221,667 B2 | 5/2007 | Hori et al. |
| 8,755,071 B2 | 6/2014 | Terashita |
| 8,997,175 B2 | 3/2015 | Omori |
| 10,120,629 B2 | 11/2018 | Terashita |

(Continued)

FOREIGN PATENT DOCUMENTS

| | | | |
|---|---|---|---|
| JP | 2004128785 A | 4/2004 |
| JP | 2012113349 A | 6/2012 |

(Continued)

OTHER PUBLICATIONS

Office Action for JP Patent Application No. JP2020056950, Nov. 14, 2023, 9 pages of Office Action.

*Primary Examiner* — Jeffrey M Rutkowski
*Assistant Examiner* — Mehedi S Aley
(74) *Attorney, Agent, or Firm* — CHIP LAW GROUP (57) ABSTRACT

An electronic apparatus includes a wireless communication section capable of executing first wireless communication, which is communication with a terminal device through an external access point and second wireless communication, which is direct connection to the terminal device and a processing section configured to perform communication control for the wireless communication section. When security strength of a second security standard of the second wireless communication is higher compared with security strength of a first security standard of the first wireless communication, the wireless communication section switches the communication with the terminal device from the first wireless communication to the second wireless communication.

11 Claims, 7 Drawing Sheets

(56) References Cited

U.S. PATENT DOCUMENTS

| | | | |
|---|---|---|---|
| 10,165,548 B2 | 12/2018 | Yokoyama et al. | |
| 10,169,587 B1* | 1/2019 | Nix | H04W 12/041 |
| 2004/0063458 A1 | 4/2004 | Hori et al. | |
| 2004/0125778 A1* | 7/2004 | Lin | H04L 63/08 |
| | | | 370/338 |
| 2006/0058059 A1* | 3/2006 | Kim | H04W 88/06 |
| | | | 455/41.2 |
| 2007/0060128 A1* | 3/2007 | Kil | H04W 88/08 |
| | | | 455/436 |
| 2011/0039494 A1* | 2/2011 | Shon | H04W 4/80 |
| | | | 713/168 |
| 2012/0127523 A1 | 5/2012 | Terashita | |
| 2013/0133029 A1 | 5/2013 | Omori | |
| 2014/0240782 A1 | 8/2014 | Terashita | |
| 2015/0002892 A1* | 1/2015 | Maeda | G06F 3/1292 |
| | | | 358/1.15 |
| 2017/0156172 A1 | 6/2017 | Yokoyama et al. | |
| 2018/0027025 A1* | 1/2018 | Ma | H04L 63/205 |
| | | | 726/7 |
| 2019/0265923 A1* | 8/2019 | Ikeda | H04N 1/00413 |
| 2019/0265924 A1* | 8/2019 | Ikeda | G06F 3/1209 |

FOREIGN PATENT DOCUMENTS

| | | |
|---|---|---|
| JP | 2015046841 A | 3/2015 |
| JP | 2017098901 A | 6/2017 |
| WO | 2012011264 A1 | 1/2012 |

* cited by examiner

ELECTRONIC APPARATUS, COMMUNICATION SYSTEM, AND COMMUNICATION METHOD

The present application is based on, and claims priority from JP Application Serial Number 2020-056950, filed Mar. 27, 2020, the disclosure of which is hereby incorporated by reference herein in its entirety.

BACKGROUND

1. Technical Field

The present disclosure relates to an electronic apparatus, a communication system, a communication method, and the like.

2. Related Art

Since wireless security and a wireless communication standard have always been improved, security standards adapted to a plurality of wireless apparatuses owned by a user are not always the same. Therefore, security strength of wireless communication is different according to a form of connection.

For example, JP-A-2015-46841 (Patent Literature 1) discloses a method of, when a plurality of base stations are present, connecting a base station using a strongest encryption scheme and a terminal station device. The terminal station device in Patent Literature 1 is, for example, a tablet terminal. The base station device is a wireless router, a smartphone executing tethering, or the like.

Patent Literature 1 is a method of selecting one of the plurality of base stations. Therefore, in the method of related art, when a plurality of kinds of communication including direct connection are usable as wireless communication between a terminal device and an electronic apparatus, it is difficult to select appropriate wireless communication.

SUMMARY

An aspect of the present disclosure relates to an electronic apparatus including: a wireless communication section capable of executing first wireless communication, which is communication with a terminal device through an external access point, and second wireless communication, which is direct connection to the terminal device; and a processing section configured to perform communication control for the wireless communication section. When security strength of a second security standard of the second wireless communication is higher compared with security strength of a first security standard of the first wireless communication, the wireless communication section switches the communication with the terminal device from the first wireless communication to the second wireless communication.

Another aspect of the present disclosure relates to a communication system including the electronic apparatus and the terminal device explained above.

Still another aspect of the present disclosure relates to a communication method by an electronic apparatus and a terminal device that perform communication according to one of first wireless communication through an external access point and second wireless communication, which is direct connection, the communication method including: communicating information concerning a second security standard of the second wireless communication using the first wireless communication; determining, based on the communicated information, whether to switch the communication between the electronic apparatus and the terminal device from the first wireless communication to the second wireless communication; and, when security strength of the second security standard is higher compared with security strength of a first security standard of the first wireless communication, switching the communication between the electronic apparatus and the terminal device from the first wireless communication to the second wireless communication.

DESCRIPTION OF EXEMPLARY EMBODIMENTS

An embodiment is explained below. The embodiment explained below does not unduly limit contents described in the appended claims. Not all of components explained in this embodiment are always essential constituent elements.

1. System Configuration and Overview of Processing

Figure 1:
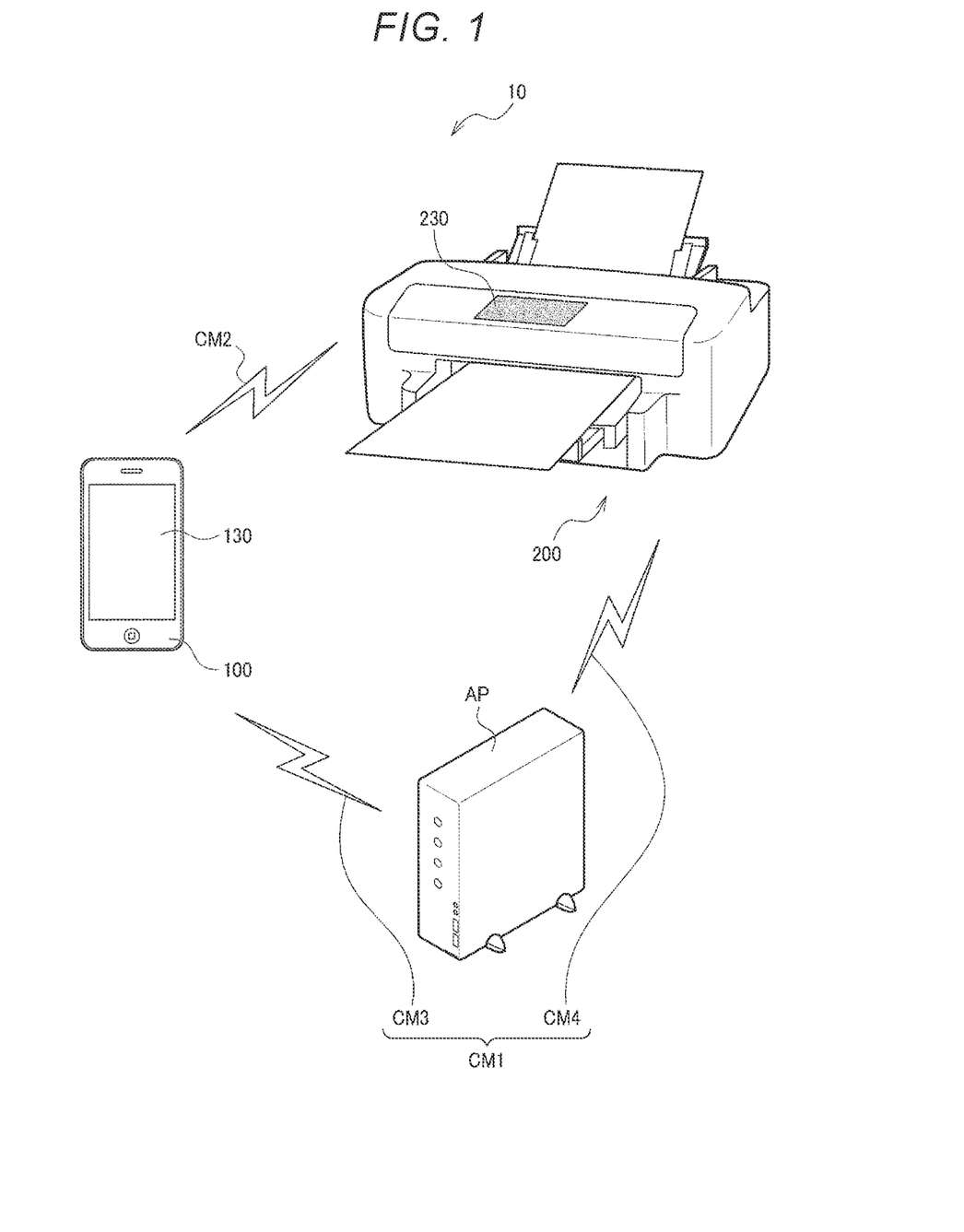
FIG. 1 is a configuration example of a communication system including a terminal device and an electronic apparatus.

FIG. 1 is a diagram schematically showing an example of a communication system 10 in this embodiment. The communication system 10 includes a terminal device 100 and an electronic apparatus 200.

The terminal device 100 may be a portable terminal device such as a smartphone or a tablet terminal or may be an information processing device such as a PC (Personal Computer).

The electronic apparatus 200 is, for example, a printer. Alternatively, the electronic apparatus 200 may be a scanner, a facsimile apparatus, or a copying machine. The electronic apparatus 200 may be a multifunction peripheral (MFP) having a plurality of functions. A multifunction peripheral having a printing function is also an example of the printer. Alternatively, the electronic apparatus 200 may be a projector, a head-mounted display apparatus, a wearable apparatus, a biological information measurement apparatus, a robot, a video apparatus, a physical quantity measurement apparatus, or the like. The biological information measurement apparatus is a pulsimeter, a pedometer, an activity meter, or the like. The video apparatus is a camera or the like.

The communication system 10 is not limited to the configuration shown in FIG. 1. Various modified implementations such as addition of other constituent elements are possible. Modified implementations such as omission and addition of constituent elements are also possible in FIGS. 2 and 3 referred to below.

The terminal device 100 and the electronic apparatus 200 are capable of performing wireless communication. The wireless communication is communication using a Wi-Fi scheme. The Wi-Fi scheme is, for example, a wireless communication scheme based on an IEEE (Institute of Electrical and Electronics Engineers) 802.11 standard and a standard equivalent to the IEEE802.11 standard.

For example, both of the terminal device 100 and the electronic apparatus 200 may operate as stations. The terminal device 100 and the electronic apparatus 200 connect to an external access point AP, whereby the communication between the terminal device 100 and the electronic apparatus 200 is performed. The external access point AP is, for example, a wireless router having a router function. In the following explanation, the communication between the terminal device 100 and the electronic apparatus 200 through the external access point AP is described as first wireless communication CM1. As shown in FIG. 1, the first wireless communication CM1 is realized by third wireless communication CM3 between the terminal device 100 and the external access point AP and fourth wireless communication CM4 between the electronic apparatus 200 and the external access point AP.

Alternatively, the electronic apparatus 200 may be capable of starting an internal access point. The internal access point may be described as software access point. The terminal device 100 connects to the internal access point of the electronic apparatus 200. In the following explanation, direct connection of the terminal device 100 and the electronic apparatus 200 using the internal access point is described as second wireless communication CM2.

Figure 2:
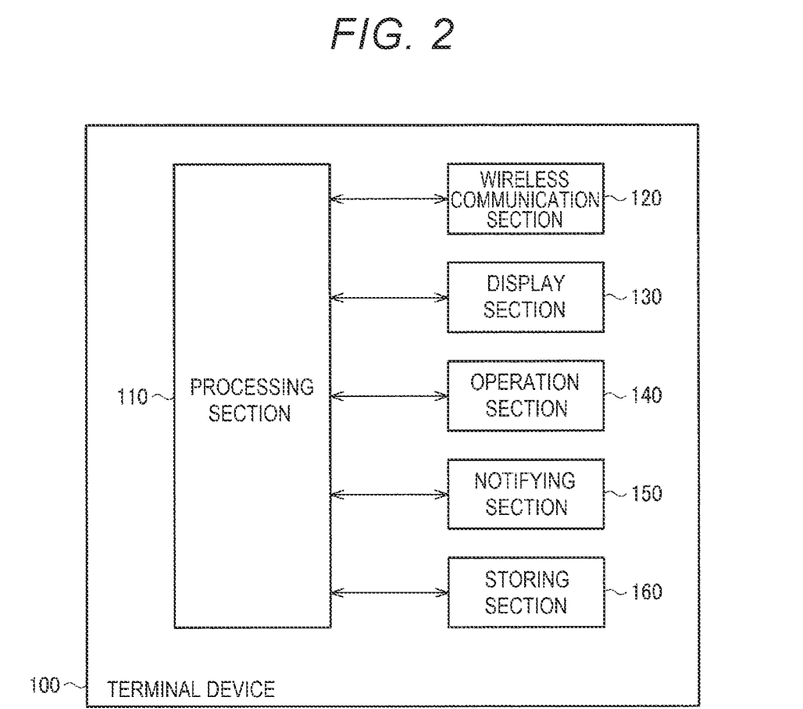
FIG. 2 is a configuration example of the terminal device.

FIG. 2 is a block diagram showing an example of the configuration of the terminal device 100. The terminal device 100 includes a processing section 110, a wireless communication section 120, a display section 130, an operation section 140, a notifying section 150, and a storing section 160.

The processing section 110 performs control of the wireless communication section 120, the display section 130, the operation section 140, the notifying section 150, and the storing section 160. The processing section 110 is specifically a processor or a controller.

The processing section 110 in this embodiment is configured by hardware explained below. The hardware can include at least one of a circuit that processes a digital signal and a circuit that processes an analog signal. For example, the hardware can be configured by one or a plurality of circuit devices or one or a plurality of circuit elements mounted on a circuit board. The one or the plurality of circuit devices are, for example, ICs (Integrated Circuits) or FPGAs (field-programmable gate arrays). The one or the plurality of circuit elements are, for example, resistors or capacitors.

The processing section 110 may be realized by a processor explained below. The terminal device 100 in this embodiment includes a memory that stores information and a processor that operates based on the information stored in the memory. The information is, for example, programs and various data. The processor includes hardware. As the processor, various processors such as a CPU (Central Processing Unit), a GPU (Graphics Processing Unit), and a DSP (Digital Signal Processor) can be used. The memory may be a semiconductor memory such as an SRAM (Static Random Address Memory) or a DRAM (Dynamic Random Access Memory), may be a register, may be a magnetic storage device such as a hard disk device, or may be an optical storage device such as an optical disk device. For example, the memory stores an instruction readable by a computer. The processor executes the instruction, whereby a function of the processing section 110 is realized as processing. The instruction may be an instruction of an instruction set configuring a program or may be an instruction for instructing a hardware circuit of the processor to perform operation. Further, the entire or a part of the processing section 110 may be realized by cloud computing.

The wireless communication section 120 is realized by at least one wireless communication device. The wireless communication device may be called wireless communication chip as well. The wireless communication device includes a wireless communication device that executes wireless communication conforming to a Wi-Fi standard. However, the wireless communication section 120 may include a wireless communication device that executes wireless communication conforming to a standard other than the Wi-Fi standard. The standard other than the Wi-Fi standard may be, for example, Bluetooth (registered trademark) and is BLE (Bluetooth Low Energy) in a narrow sense.

The display section 130 is configured by a display or the like that displays various kinds of information to a user. The operation section 140 is configured by buttons or the like that receive input operation from the user. The display section 130 and the operation section 140 may be integrally configured by, for example, a touch panel. The notifying section 150 performs notification to the user. For example, the notifying section 150 may be a speaker that performs notification by sound, may be a vibrating section that performs notification by vibration, or may be a combination of the speaker and the vibrating section.

The storing section 160 stores various kinds of information such as data and programs. The processing section 110 and the wireless communication section 120 operate using, for example, the storing section 160 as a work area. The storing section 160 may be a semiconductor memory such as an SRAM or a DRAM, may be a register, may be a magnetic storage device, or may be an optical storage device.

Figure 3:
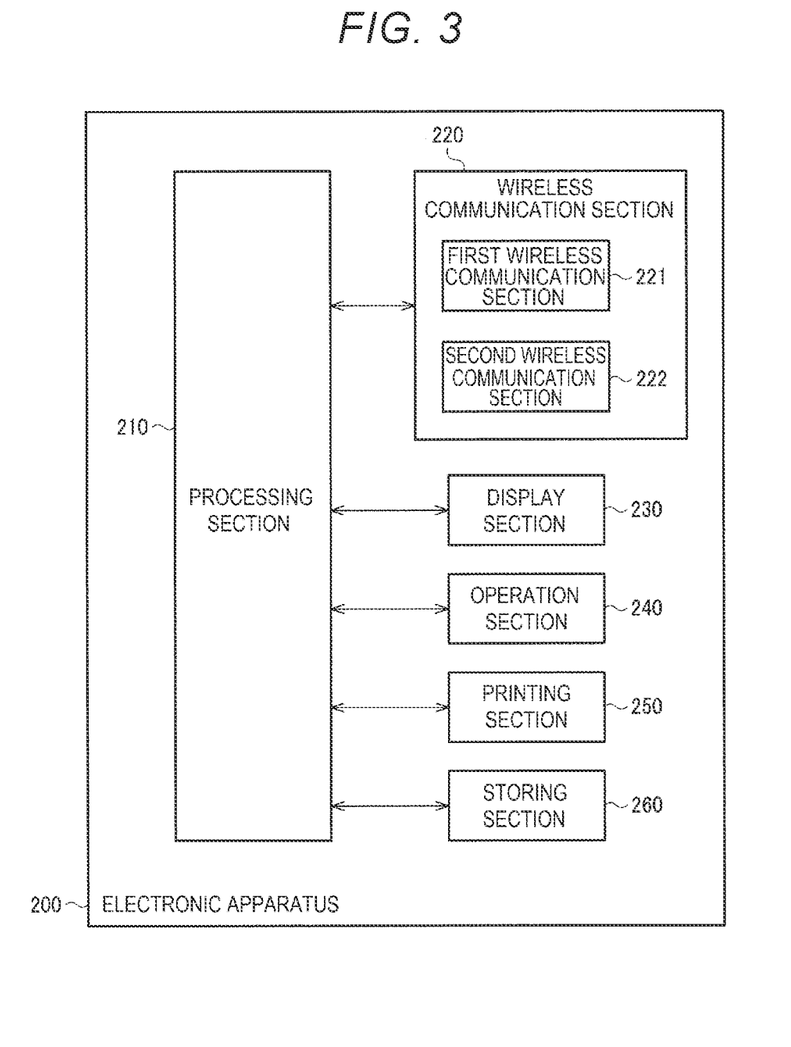
FIG. 3 is a configuration example of the electronic apparatus.

FIG. 3 is a block diagram showing an example of the configuration of the electronic apparatus 200. FIG. 3 shows the electronic apparatus 200 having a printing function. In the following explanation, an example in which the electronic apparatus 200 is a printer is explained as appropriate. However, as explained above, the electronic apparatus 200 can be extended to an apparatus other than the printer. The electronic apparatus 200 includes a processing section 210, a wireless communication section 220, a display section 230, an operation section 240, a printing section 250, and a storing section 260.

The processing section 210 performs control of the sections of the electronic apparatus 200. The sections of the electronic apparatus 200 are, for example, the wireless communication section 220, the storing section 260, and the printing section 250. For example, the processing section 210 can include a plurality of CPUs such as a main CPU and a sub-CPU. The main CPU performs control of the sections of the electronic apparatus 200 and overall control of the electronic apparatus 200. The sub-CPU is, for example, a CPU that performs communication control of the wireless communication section 220. Alternatively, when the electronic apparatus 200 is the printer, a CPU that performs various kinds of processing about printing may be further provided.

The processing section 210 in this embodiment is configured by hardware including at least one of a circuit that processes a digital signal and a circuit that processes an analog signal. For example, the hardware can be configured by one or a plurality of circuit devices or one or a plurality of circuit elements mounted on a circuit board.

The processing section 210 may be realized by a processor including hardware. The electronic apparatus 200 in this embodiment includes a memory that stores information and a processor that operates based on the information stored in the memory. The information is, for example, programs and various data. As the processor, various processors such as a CPU, a GPU, and a DSP can be used. The memory is a semiconductor memory, a register, a magnetic storage device, an optical storage device, and the like. For example, the memory stores an instruction readable by a computer. The processor executes the instruction, whereby a function of the processing section 210 is realized as processing. Further, the entire or a part of the processing section 210 may be realized by cloud computing.

The wireless communication section 220 includes a first wireless communication section 221 and a second wireless communication section 222. The first wireless communication section 221 performs wireless communication at the time when the electronic apparatus 200 operates as a Wi-Fi station. For example, the first wireless communication section 221 executes the fourth wireless communication CM4, which is communication with the external access point AP. The second wireless communication section 222 performs wireless communication at the time when the electronic apparatus 200 operates as an access point of Wi-Fi. The second wireless communication section 222 executes the second wireless communication CM2 by starting the internal access point and receiving connection from the terminal device 100.

The wireless communication section 220 is realized by at least one wireless communication device that executes wireless communication conforming to the Wi-Fi standard. Specifically, the wireless communication section 220 supports a Wi-Fi Direct (registered trademark) scheme. The first wireless communication section 221 and the second wireless communication section 222 may be respectively realized by different wireless communication devices. Alternatively, the first wireless communication section 221 and the second wireless communication section 222 may be realized by a common wireless communication device. For example, one wireless communication device executes the first wireless communication CM1 and the second wireless communication CM2 in a time division manner, whereby the first wireless communication section 221 and the second wireless communication section 222 may be realized. The wireless communication section 220 may be capable of executing wireless communication conforming to a standard other than the Wi-Fi standard.

The display section 230 is configured by a display or the like that displays various kinds of information to the user. The operation section 240 is configured by buttons or the like that receive input operation from the user. The display section 230 and the operation section 240 may be integrally configured by, for example, a touch panel.

The printing section 250 includes a printing engine. The printing engine is a mechanical component that executes printing of an image on a printing medium. The printing engine includes, for example, a conveying mechanism, an ejection head of an inkjet scheme, and a driving mechanism for a carriage including the ejection head. The printing engine ejects, from the ejection head, ink to a printing medium conveyed by the conveying mechanism to print an image on the printing medium. The printing medium may be paper, may be cloth, or may be another medium. A specific configuration of the printing engine is not limited to the configuration illustrated above. The printing engine may perform printing with toner in an electrophotographic scheme.

The storing section 260 stores various kinds of information such as data and programs. The processing section 210 and the wireless communication section 220 operate using, for example, the storing section 260 as a work area. The storing section 260 may be a semiconductor memory, may be a register, may be a magnetic storage device, or may be an optical storage device. The storing section 260 may store data transmitted from the terminal device 100 by wireless communication. The data is, for example, data used for printing in the printing section 250.

Figure 4:
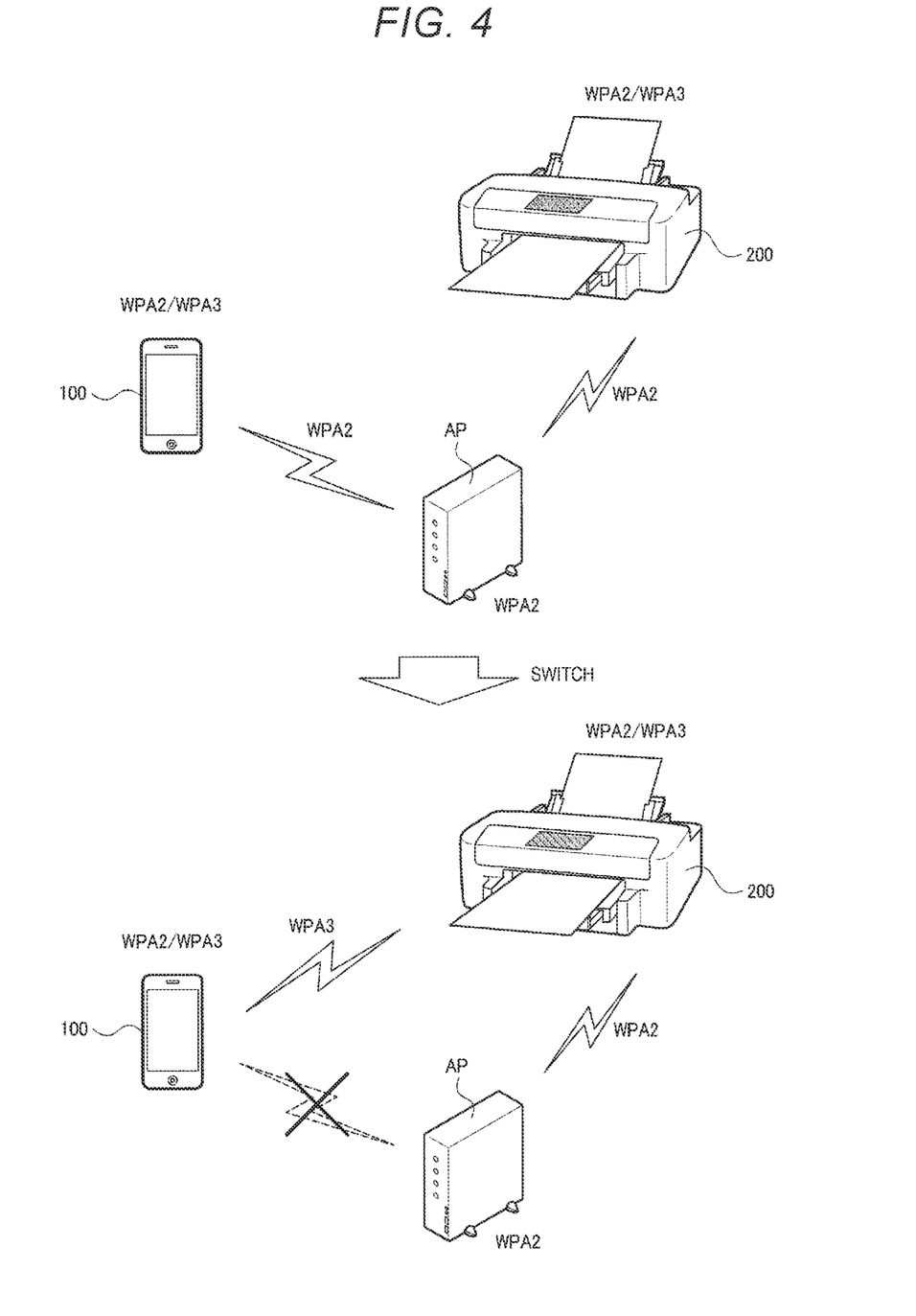
FIG. 4 is a diagram for explaining a method in an embodiment.

FIG. 4 is a diagram for explaining an overview of processing in this embodiment. As explained above with reference to FIGS. 1 to 3, the terminal device 100 and the electronic apparatus 200 are capable of executing the first wireless communication CM1, which is the wireless communication through the external access point AP. For example, a job is transmitted from the terminal device 100 to the electronic apparatus 200. When the electronic apparatus 200 is a printer, the job is a printing job. The printing job is information including image information set as a printing target and printing setting information. The printing setting information is information for specifying setting values about setting items such as a paper size, simplex/duplex, and color/monochrome. Consequently, it is possible to cause, using the terminal device 100 such as a smartphone or a PC, the electronic apparatus 200 to execute printing.

Since wireless security has always been improved, security standards corresponding to a plurality of wireless apparatuses owned by a user are not always the same. Therefore, even if a user uses many latest wireless apparatuses, a security level is sometimes low because the external access point AP at a connection destination is old.

For example, as shown in FIG. 4, the terminal device 100 and the electronic apparatus 200 are adapted to both of WPA2 (Wi-Fi Protected Access 2) and WPA3 (Wi-Fi Protected Access 3). The external access point AP is adapted to the WPA2 but is not adapted to the WPA3. Since the external access point AP is not adapted to the WPA3, the third wireless communication CM3 between the terminal device 100 and the external access point AP is, for example, communication using the WPA2 as a security standard. Similarly, the fourth wireless communication CM4 between the electronic apparatus 200 and the external access point AP is communication using the WPA2 as a security standard. As a result, although the terminal device 100 and the electronic apparatus 200 are adapted to the WPA3 having higher security strength, wireless communication between the terminal device 100 and the electronic apparatus 200 is performed by the WPA2 having low security strength.

The electronic apparatus 200 in this embodiment includes the wireless communication section 220 and the processing section 210 as shown in FIG. 3. The wireless communication section 220 is capable of executing the first wireless communication CM1, which is the communication with the terminal device 100 through the external access point AP, and the second wireless communication CM2, which is the direct connection to the terminal device 100. The processing section 210 performs communication control for the wireless communication section 220.

When the security strength of the second security standard of the second wireless communication CM2 is higher compared with the security strength of the first security standard of the first wireless communication CM1, the wireless communication section 220 switches the communication with the terminal device 100 from the first wireless communication CM1 to the second wireless communication CM2. For example, it is possible to perform communication using the WPA3 as the security standard by directly connecting the terminal device 100 and the electronic apparatus 200 using the internal access point of the electronic apparatus 200 as shown in FIG. 4. Accordingly, it is possible to increase the security strength compared with before the switching.

Security standards in this embodiment are not limited to the WPA2 and the WPA3. For example, the security standards may include other standards such as WEP (Wired Equivalent Privacy) and WPA (Wi-Fi Protected Access). Information concerning encryption schemes may be included in the security standards. The encryption schemes include a TKIP (Temporal Key Integrity Protocol) and an AES (Advanced Encryption Standard).

It is difficult to execute comparison of the security strength of the first security standard and the security strength of the second security standard with the electronic apparatus 200 alone. For example, it is necessary to learn the ability of the terminal device 100 in order to specify the second security standard. It is necessary to learn a security standard of the third wireless communication CM3 between the terminal device 100 and the external access point AP in order to appropriately specify the first security standard. That is, information concerning the terminal device 100 is necessary to determine the security strength in the electronic apparatus 200. The determination of the security strength may be executed in the terminal device 100. However, in that case, the terminal device 100 needs to acquire information concerning the security of the electronic apparatus 200. Specific processing is explained below with reference to FIGS. 5 to 7.

The method in this embodiment can be applied to the communication system 10 including the electronic apparatus 200 and the terminal device 100. Consequently, it is possible to realize a system capable of executing wireless communication with high security strength between the terminal device 100 and the electronic apparatus 200.

The processing performed by the communication system 10 in this embodiment may be realized as a communication method. The communication method in this embodiment is a communication method by the electronic apparatus 200 and the terminal device 100 that perform communication using one of the first wireless communication CM1 through the external access point AP and the second wireless communication CM2, which is the direct connection. The communication method communicates, using the first wireless communication CM1, information concerning the second security standard of the second wireless communication CM2 and determines, based on the communicated information, whether to switch the communication between the electronic apparatus 200 and the terminal device 100 from the first wireless communication CM1 to the second wireless communication CM2. Specifically, when the security strength of the second security standard is higher compared with the security strength of the first security standard of the first wireless communication CM1, the communication method switches the communication between the electronic apparatus 200 and the terminal device 100 from the first wireless communication CM1 to the second wireless communication CM2.

The method of Patent Literature 1 is a method of, when a plurality of access points connected to a network are present, preferentially connecting to an access point capable of executing communication with high security strength. However, Patent Literature 1 and the like do not disclose a method of selecting an appropriate communication form among wireless communications including the direct connection. In particular, in this embodiment, it is important to perform transmission and reception of information between the terminal device 100 and the electronic apparatus 200. Accordingly, it is unpreferable to connect the terminal device 100 to a network different from a network to which the electronic apparatus 200 belongs.

When an access point having high security strength is selected using the method of the patent literature 1, it is not guaranteed that the communication between the terminal device 100 and the electronic apparatus 200 is possible. For example, in the method of Patent Literature 1, when each of the terminal device 100 and the electronic apparatus 200 is regarded as a station, each of the terminal device 100 and the electronic apparatus 200 is only connected to an access point having high priority. When the electronic apparatus 200 is regarded as an access point, the terminal device 100 only selects an access point having high priority from a plurality of access points including the electronic apparatus 200. That is, in the method of Patent Literature 1, the first wireless communication CM1 or the second wireless communication CM2 is sometimes realized in a part of cases. However, the connection between the terminal device 100 and the electronic apparatus 200 is not guaranteed. Moreover, switching between the first wireless communication CM1 and the second wireless communication CM2 is not disclosed at all.

2. Flow of the Processing

Figure 5:
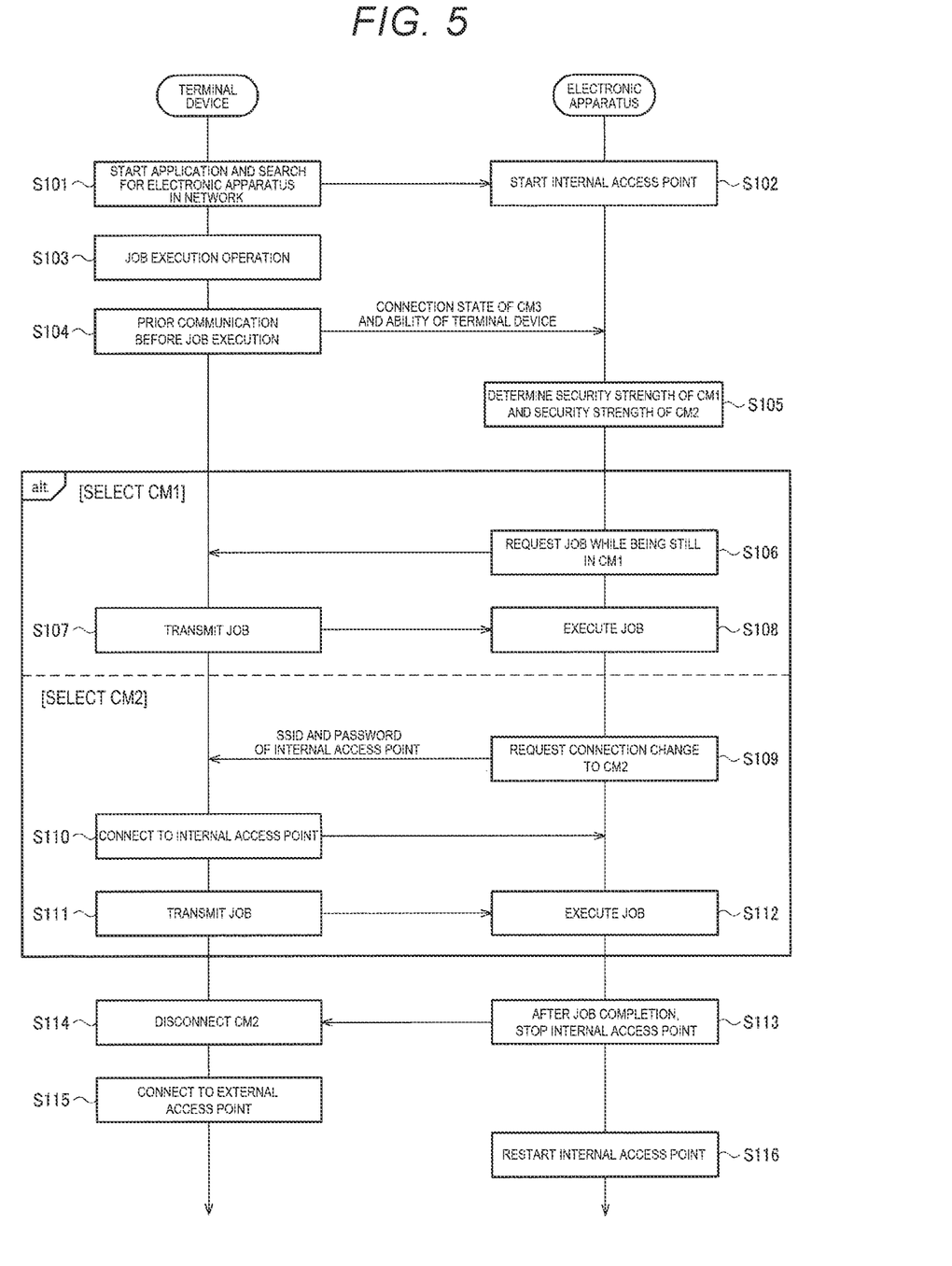
FIG. 5 is a diagram for explaining a flow of processing in the embodiment.

FIG. 5 is a diagram for explaining a flow of the processing in this embodiment. Before the processing shown in FIG. 5 is started, the third wireless communication CM3 between the terminal device 100 and the external access point AP and the fourth wireless communication CM4 between the electronic apparatus 200 and the external access point AP have been established. That is, the communication between the terminal device 100 and the electronic apparatus 200 can be performed using the first wireless communication CM1.

When the processing shown in FIG. 5 is started, first, the terminal device 100 starts application software (step S101). The application software is a program stored in the storing section 160 of the terminal device 100. The processing section 110 of the terminal device 100 executes predetermined processing by operating according to the program. The application software is specifically a program specifying processing for causing the electronic apparatus 200 to execute a job. When the electronic apparatus 200 is a printer, the application software is a printing application for causing, via a network, the printer to execute a printing job.

In step S101, the application software performs processing for searching for the electronic apparatus 200 connected to a network. The network is a network constructed by the external access point AP to which the terminal device 100 is connected. For example, the terminal device 100 performs processing for transmitting a packet or the like, which designates a broadcast address, and receiving a response from the electronic apparatus 200 connecting to the network. Specifically, the terminal device 100 performs processing for registering, as a printer that the terminal device 100 causes the printer to execute printing, the electronic apparatus 200 selected by the user among search results of the electronic apparatus 200 functioning as the printer.

When it is determined that the terminal device 100 that executes the application software is present in the network, the electronic apparatus 200 starts the internal access point (step S102). For example, when receiving a packet broadcasted from the terminal device 100, the electronic apparatus 200 performs processing for starting the internal access point.

Subsequently, the terminal device 100 receives job execution operation by the user (step S103). The job execution operation is, for example, user operation for depressing a printing execution button after performing selection of a printing target image and printing setting. The processing in step S101 or S102 is preprocessing for performing processing in step S103 and subsequent steps. The processing in steps S101 and S102 and the processing in step S103 do not need to be continuously performed.

In the method of related art, a job is transmitted from the terminal device 100 to the electronic apparatus 200 with the operation in step S103 as a trigger. The electronic apparatus 200 starts execution of the job. In contrast, in this embodiment, processing for determining security strength of the wireless communication between the terminal device 100 and the electronic apparatus 200 and switching the wireless communication when necessary are performed.

First, the terminal device 100 performs prior communication before job execution (step S104). Specifically, the terminal device 100 outputs information representing a connection state of the third wireless communication CM3 and information representing the ability of the terminal device 100. The connection state of the third wireless communication CM3 is information representing a security standard used for the third wireless communication CM3 and is information representing the WPA2 in the example shown in FIG. 4. As explained above, the third wireless communication CM3 has already been established. For the terminal device 100, the security standard used for the third wireless communication CM3 is known information. The ability of the terminal device 100 is specifically information concerning a security standard supported by the terminal device 100 and is information representing the WPA2/the WPA3 in the example shown in FIG. 4. The ability of the terminal device 100 is also known information for the terminal device 100. The processing in step S104 is performed using the first wireless communication CM1.

The electronic apparatus 200 performs, based on the acquired information and information concerning the electronic apparatus 200 itself, determination of security strength about the security standard of the first wireless communication CM1 and the security standard of the second wireless communication CM2 (step S105).

Figure 6:
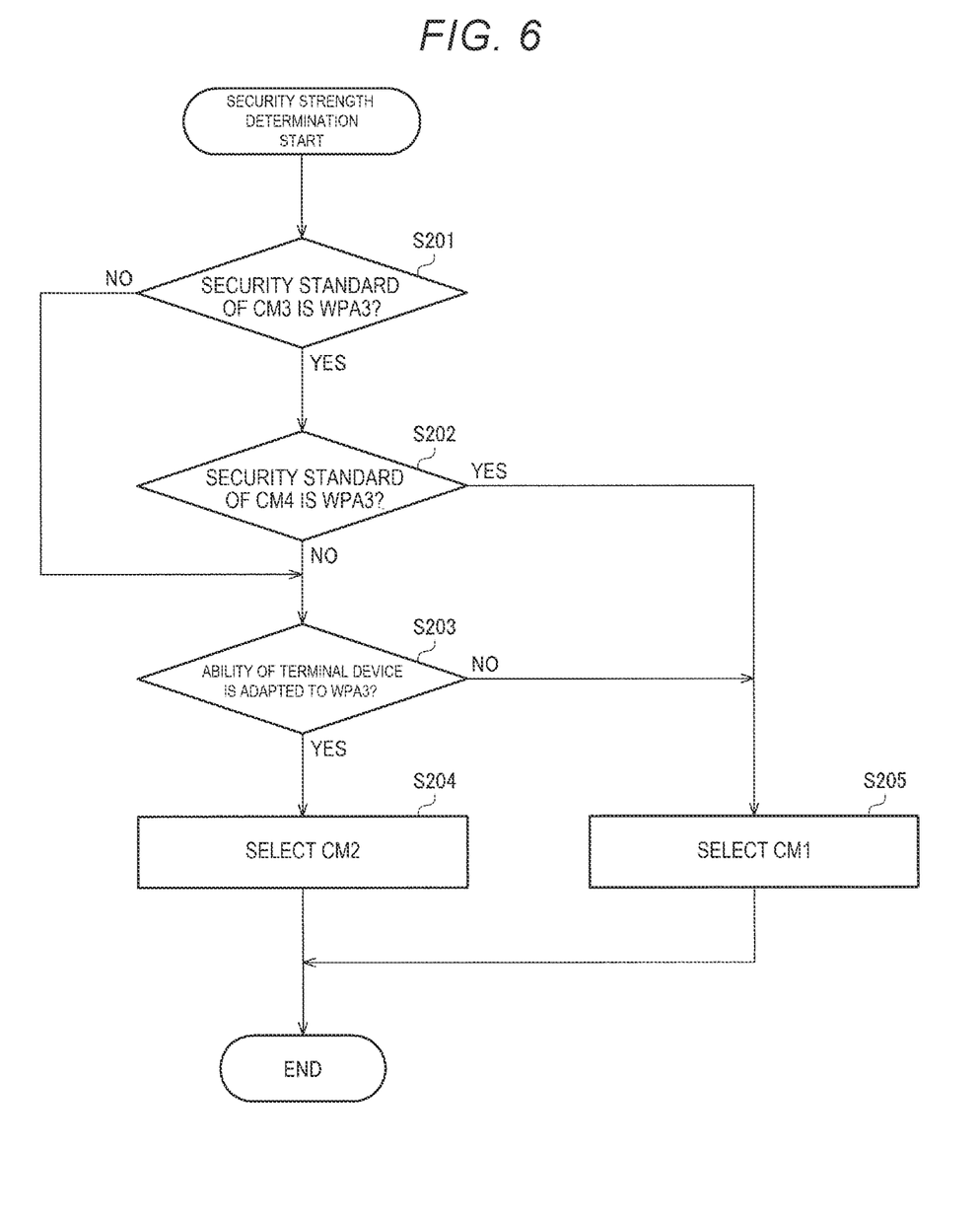
FIG. 6 is a flowchart for explaining determination processing for security strength.

FIG. 6 is a flowchart for explaining determination processing for security strength. When this processing is started, first, the processing section 210 of the electronic apparatus 200 determines whether the security standard of the third wireless communication CM3 is a standard with the highest security strength among security standards supported by the electronic apparatus 200 (step S201). In FIG. 6, an example is shown in which a standard with the highest security strength supported by the electronic apparatus 200 is the WPA3. In the case of Yes in step S201, the processing section 210 determines whether a security standard of the fourth wireless communication CM4 is the WPA3 (step S202). The fourth wireless communication CM4 has already been established. For the electronic apparatus 200, the security standard used for the fourth wireless communication CM4 is known information. Whichever of the processing in step S201 and the processing in step S202 may be performed first.

When the security strength is determined, the security standard of the first wireless communication CM1 only has to be considered a security standard with lower strength of the security standard of the third wireless communication CM3 and the security standard of the fourth wireless communication CM4. Accordingly, in the case of Yes in both of steps S201 and S202, the security standard of the first wireless communication CM1 is the WPA3. Since the security strength of the first wireless communication CM1 is sufficiently high, the processing section 210 selects the first wireless communication CM1 as the wireless communication between the terminal device 100 and the electronic apparatus 200 (step S205).

When at least one of steps S201 and S202 is No, the security standard of the first wireless communication CM1 is the WPA2 or a standard with lower security strength than the WPA2. Therefore, it is likely that the security strength is improved by switching the wireless communication. Accordingly, the processing section 210 determines the security strength of the second wireless communication CM2.

Specifically, the processing section 210 determines, based on the information acquired from the terminal device 100 in step S104, whether the ability of the terminal device 100 is adapted to the WPA3 (step S203). In the case of No in step S203, even if the wireless communication is switched to the direct connection, wireless communication using the WPA3 cannot be performed. Accordingly, the processing section 210 selects the first wireless communication CM1 as the wireless communication between the terminal device 100 and the electronic apparatus 200 (step S205).

In the case of Yes in step S203, the WPA3 can be used in the second wireless communication CM2, which is the direct connection. Accordingly, the processing section 210 selects the second wireless communication CM2 as the wireless communication between the terminal device 100 and the electronic apparatus 200 (step S204).

Referring back to FIG. 5, when the first wireless communication CM1 is selected in step S105, the first wireless communication CM1 is maintained. Specifically, the electronic apparatus 200 performs processing for requesting a job while still being in the first wireless communication CM1 (step S106). The terminal device 100 transmits a job according to the job request (step S107). The electronic apparatus 200 executes the transmitted job (step S108). For example, the electronic apparatus 200 executes printing based on information transmitted from the terminal device 100.

On the other hand, when the second wireless communication CM2 is selected in step S105, processing for switching the wireless communication is performed. Specifically, the electronic apparatus 200 transmits, to the terminal device 100, a request for connection change to the second wireless communication CM2 (step S109). At this time, the electronic apparatus 200 transmits, as information for connecting to the internal access point started in step S102, an SSID (Service Set Identifier) and a password of the internal access point. The SSID includes an ESSID (Extended SSID). In the following explanation, the information for connecting to the internal access point is described as connection information.

The terminal device 100 performs connection to the internal access point using the acquired SSID and the acquired password (step S110). The electronic apparatus 200 receives the connection, whereby the second wireless communication CM2 is established. As shown in FIG. 4, the switching from the first wireless communication CM1 to the second wireless communication CM2 is performed by the processing in steps S109 and S110. After the switching, the terminal device 100 transmits a job (step S111). The electronic apparatus 200 executes the transmitted job (step S112).

When the first wireless communication CM1 is switched to the second wireless communication CM2, the terminal device 100 is assumed to be not connecting to the external access point AP. In this state, the terminal device 100 cannot perform communication through the external access point AP. For example, the terminal device 100 cannot perform connection, Internet connection, and the like to apparatuses other than the electronic apparatus 200.

Accordingly, the wireless communication section 220 of the electronic apparatus 200 may switch the communication with the terminal device 100 from the second wireless communication CM2 to the first wireless communication CM1 after the communication with the terminal device 100 by the second wireless communication CM2 ends. Consequently, the terminal device 100 can execute communication with the apparatuses other than the electronic apparatus 200. Therefore, the switching of the wireless communication is smoothly performed.

Specifically, after completion of the job, the electronic apparatus 200 once stops the internal access point (step S113). Consequently, the second wireless communication CM2 is disconnected (step S114). Accordingly, the terminal device 100 performs reconnection to an access point to which the terminal device 100 has a history of connection. For example, the terminal device 100 reconnects to the external access point AP (step S115). After staying on standby for a given standby time, the electronic apparatus 200 restarts the internal access point (step S116). The standby time is a time determined as being longer than a time required until completion of the connection between the terminal device 100 and the external access point AP. Consequently, it is possible to increase probability that the terminal device 100 reconnects to the external access point AP after the job completion. Since the internal access point is changed to a started state by the processing in step S116, when the wireless communication is switched to the second wireless communication CM2 again, it is possible to smoothly perform the switching.

As explained above, when the wireless communication section 220 receives an execution instruction for a job from the terminal device 100, the processing section 210 executes the job. This processing corresponds to, for example, steps S107, S108, S111, and S112 in FIG. 5. Consequently, it is possible to cause, using the terminal device 100, the electronic apparatus 200 to execute the job. At that time, as shown in step S104, when the wireless communication section 220 receives, from the terminal device 100, the prior communication before the transmission of the execution instruction for the job, the processing section 210 may determine whether to switch the communication with the terminal device 100 from the first wireless communication CM1 to the second wireless communication CM2.

When the job is executed, information necessary for the job execution is assumed to be supplied from the terminal device 100. For example, in a printing job, since image information and the like are transmitted, it is conceivable that highly confidential information is included in the image information and the like. Accordingly, by using the job execution as a trigger for the switching determination for the wireless communication, it is possible to execute the determination at appropriate timing.

The wireless communication section 220 acquires the information concerning the second security standard from the terminal device 100. Since the second wireless communication CM2 is the direct connection between the terminal device 100 and the electronic apparatus 200, the security strength is not affected by apparatuses other than the terminal device 100 and the electronic apparatus 200. However, it is unknown for the electronic apparatus 200 which security standard is supported by the terminal device 100. Therefore, it is difficult to appropriately determine the second security standard and the strength of the second security standard in that state. As shown in step S104, by acquiring the information concerning the terminal device 100, the processing section 210 can appropriately determine whether to switch the communication with the terminal device 100 from the first wireless communication CM1 to the second wireless communication CM2.

The information concerning the second security standard is terminal ability information representing a security standard supported by the terminal device 100. As shown in FIG. 6, the processing section 210 determines the second security standard based on ability information representing a security standard supported by the electronic apparatus 200 and the terminal ability information. By considering the abilities of the terminal device 100 and the electronic apparatus 200 in this way, it is possible to appropriately determine the second security standard and the strength of the second security standard.

The wireless communication section 220 may acquire, from the terminal device 100, information concerning the security standard of the third wireless communication CM3, which is the wireless communication between the terminal device 100 and the external access point AP. The processing section 210 determines the first security standard based on the security standard of the fourth wireless communication CM4 between the wireless communication section 220 and the external access point AP and the information acquired from the terminal device 100.

As explained above, from the viewpoint of the security strength, the security standard of the first wireless communication CM1 only has to be considered a standard with lower security strength of the security standard of the third wireless communication CM3 and the security standard of the fourth wireless communication CM4. Only the security standard of the fourth wireless communication CM4 is known for the electronic apparatus 200. Therefore, by acquiring, from the terminal device 100, information for specifying the security standard of the third wireless communication CM3, it is possible to appropriately determine the first security standard and the strength of the first security standard.

However, when the security standard of the fourth wireless communication CM4 is the WPA2, the security standard of the first wireless communication CM1 is not the WPA3 irrespective of the security standard of the third wireless communication CM3. In this case, the determination concerning the security standard of the third wireless communication CM3 may be omitted and the determination concerning the security standard of the second wireless communication CM2 (step S203) may be executed. That is, the acquisition of the information concerning the security standard of the wireless communication between the terminal device 100 and the external access point AP is not essential and can be omitted according to a situation.

When the security strength of the second security standard of the second wireless communication CM2 is higher compared with the security strength of the first security standard of the first wireless communication CM1, as shown in step S109, the wireless communication section 220 transmits, to the terminal device 100, a request for connection change from the first wireless communication CM1 to the second wireless communication CM2. In the second wireless communication CM2, since the electronic apparatus 200 operates as an access point, the electronic apparatus 200 needs to receive a connection request from an apparatus operating as a station. By transmitting the request for connection change, it is possible to switch the wireless connection starting from the electronic apparatus 200.

At this time, the wireless communication section 220 transmits the request for connection change to the terminal device 100 using the first wireless communication CM1. Consequently, it is possible to perform transmission and reception of information using an already established connection.

The wireless communication section 220 may transmit connection information used for the second wireless communication CM2 to the terminal device 100. The connection information includes, for example, identification information of the internal access point and a password. The identification information is, for example, an SSID. However, the identification information only has to be information capable of uniquely specifying the electronic apparatus 200 as a connection destination of wireless communication. Other information such as a MAC address may be used as the identification information. Consequently, it is possible to appropriately realize connection between the terminal device 100 and the internal access point.

3. Modifications

Several modifications are explained below.
3.1 Determination in the Terminal Device In the example explained with reference to FIG. 5, the processing section 210 of the electronic apparatus 200 determines whether to switch the wireless communication. However, the terminal device 100 may execute the determination.

Figure 7:
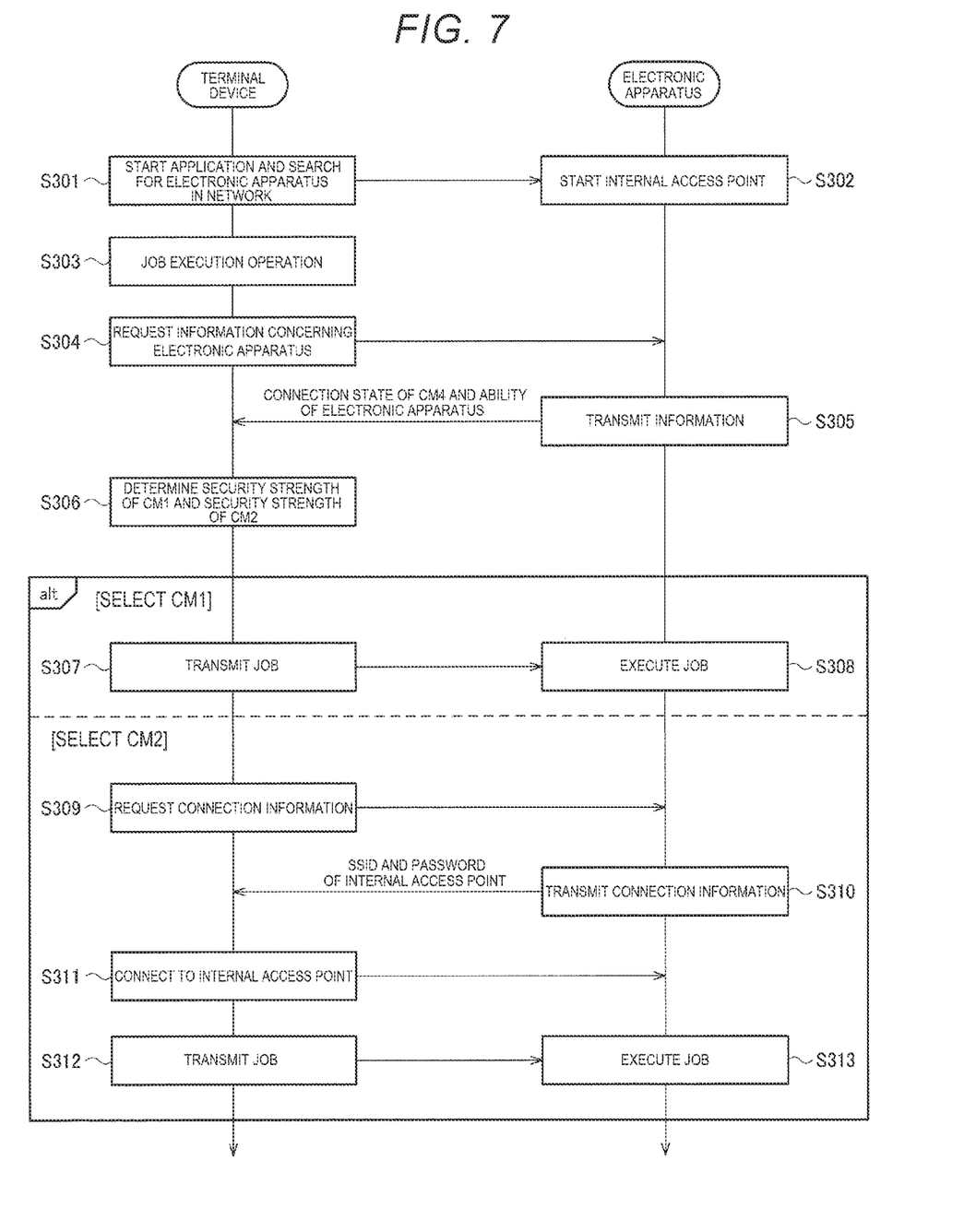
FIG. 7 is another diagram for explaining a flow of processing in the embodiment.

FIG. 7 is a diagram for explaining a flow of processing in a modification. Steps S301 to S303 in FIG. 7 are the same as steps S101 to S103 in FIG. 5.

After the reception of the job execution operation, the terminal device 100 performs prior communication before job execution. Specifically, the terminal device 100 requests information concerning the electronic apparatus 200 (step S304). As a response to the request, the electronic apparatus 200 transmits information representing a connection state of the fourth wireless communication CM4 and information representing the ability of the electronic apparatus 200 (step S305). The connection state of the fourth wireless communication CM4 is specifically information representing a security standard used for the fourth wireless communication CM4. The ability of the electronic apparatus 200 is information concerning the security standard supported by the electronic apparatus 200.

The terminal device 100 performs, based on the acquired information and the information concerning the terminal device 100 itself, determination of security strength about the security standard of the first wireless communication CM1 and the security standard of the second wireless communication CM2 (step S306).

The processing in step S306 is the same as the processing shown in FIG. 6. That is, the security standard of the first wireless communication CM1 is determined based on the security standards of the third wireless communication CM3 and the fourth wireless communication CM4. The security standard of the second wireless communication CM2 is determined based on the ability of the terminal device 100 and the ability of the electronic apparatus 200.

When the first wireless communication CM1 is selected, the first wireless communication CM1 is maintained. The terminal device 100 transmits a job while still being in the first wireless communication CM1 (step S307). The electronic apparatus 200 executes the transmitted job (step S308).

When the second wireless communication CM2 is selected, processing for switching the wireless communication is performed. Specifically, the terminal device 100 requests the electronic apparatus 200 to transmit connection information for connecting to the internal access point (step S309). The electronic apparatus 200 transmits an SSID and a password of the internal access point as a response to the request (step S310).

Steps S311 to S313, which are processing after the reception of the SSID and the password, are the same as steps S110 to S112 in FIG. 5. Therefore, detailed explanation of steps S311 to S313 is omitted. Although not shown in FIG. 7, the same processing as steps S113 to S116 in FIG. 5 may be performed after the processing in step S313.

As explained above, when receiving, from the terminal device 100, the prior communication before the transmission of the execution instruction for the job (step S304), the wireless communication section 220 of the electronic apparatus 200 may transmit, to the terminal device 100, the information concerning the second security standard and the information concerning the security standard of the fourth wireless communication CM4, which is the wireless communication between the wireless communication section 220 and the external access point AP (step S305). The information concerning the second security standard is ability information representing the security standard supported by the electronic apparatus 200. By transmitting the information concerning the electronic apparatus 200 in this way, it is possible to perform the switching determination for the wireless communication in the terminal device 100.

In this case, when receiving, from the terminal device 100, a request for connection to the internal access point for the second wireless communication CM2 (step S311), the wireless communication section 220 switches the communication with the terminal device 100 from the first wireless communication CM1 to the second wireless communication CM2.

3.2 Provisional Internal Access Point

In the examples shown in FIGS. 5 and 7, the electronic apparatus 200 transmits, using the first wireless communication CM1, to the terminal device 100, the connection information for connecting to the internal access point. However, the connection information may be transmitted using another communication path.

For example, the electronic apparatus 200 may start a second internal access point for connection information transmission and reception. The second internal access point is, for example, a software access point, an SSID and a password of which are fixed. The application software of the terminal device 100 retains the SS ID and the password of the second internal access point and is capable of connecting to the second internal access point without prior communication with the electronic apparatus 200.

For example, the processing in step S109 in FIG. 5 is replaced with a start of the second internal access point and a request for connection to the second internal access point. When receiving the request for connection, the terminal device 100 connects to the second internal access point. The electronic apparatus 200 transmits the connection information to the terminal device 100 with direct connection using the second internal access point. After the transmission of the connection information, the electronic apparatus 200 stops the second internal access point and restarts the internal access point. Processing after the transmission and reception of the connection information is the same as the processing shown in FIGS. 5 and 7.

3.3 Communication Standard

In the example explained above, the security strength is used as a criterion for determining whether to switch the wireless communication. However, other information may be used as the determination criterion for the switching in addition to the security strength.

When communication quality of the second wireless communication standard of the second wireless communication CM2 is higher compared with communication quality of the first wireless communication standard of the first wireless communication CM1, the wireless communication section 220 may switch the communication with the terminal device 100 from the first wireless communication CM1 to the second wireless communication CM2. The wireless communication standard is, for example, a standard included in IEEE802.11 and is a standard for determining other than security. The wireless communication standard is a standard for determining, for example, a frequency band, a modulation scheme, and a channel width and includes IEEE802.11a, IEEE802.11b, IEEE802.11n, and IEEE802.11ac and standards obtained by developing these standards.

For example, communication speed of IEEE802.11ac is higher compared with communication speed of IEEE802.11n. Accordingly, when security strength is the same, wireless communication conforming to IEEE802.11ac is more preferentially selected than wireless communication conforming to IEEE802.11n. In this case, as in the example of the security standard, transmission and reception of information concerning the wireless communication standard is performed. It is determined, according to the comparison of the wireless communication standard in the first wireless communication CM1 and the wireless communication standard in the second wireless communication CM2, whether to switch the wireless communication.

The embodiment is explained in detail above. Those skilled in the art will be able to easily understand that many modifications are possible without substantially departing from the new matters and the effects of the embodiment. Therefore, such modifications are assumed to be included in the scope of the present disclosure. For example, a term described together with a different term in a broader sense or a different synonymous term at least once in the specification or the drawings can be replaced with the different term in any part in the specification or the drawings. All combinations of the embodiment and the modifications are also included in the scope of the present disclosure. The configurations, the operations, and the like of the electronic apparatus, the terminal device, the communication system, and the like are not limited to those explained in the embodiment. Various modified implementations of the configurations, the operations, and the like are possible.

What is claimed is:

1. An electronic apparatus, comprising:
a wireless communication section configured to execute first wireless communication, which is communication with a terminal device through an external access point, and second wireless communication, which is direct connection to the terminal device; and
a processing section configured to perform communication control for the wireless communication section, wherein
when security strength of a second security standard of the second wireless communication is higher compared with security strength of a first security standard of the first wireless communication, the wireless communication section switches the communication with the terminal device from the first wireless communication to the second wireless communication,
the wireless communication section acquires information concerning the second security standard from the terminal device,
the acquired information concerning the second security standard is terminal ability information representing a security standard supported by the terminal device,
the processing section determines, based on the acquired information, whether to switch the communication with the terminal device from the first wireless communication to the second wireless communication,
the wireless communication section operates as an internal access point and performs the second wireless communication with the terminal device using the internal access point,
when the security strength of the second security standard of the second wireless communication is higher compared with the security strength of the first security standard of the first wireless communication, the wireless communication section transmits, to the terminal device, a request for connection change from the first wireless communication to the second wireless communication, and
the request for connection change includes connection information for connecting to the internal access point.

2. The electronic apparatus according to claim 1, wherein the processing section determines the second security standard based on ability information representing a security standard supported by the electronic apparatus and the terminal ability information.

3. The electronic apparatus according to claim 1, wherein the wireless communication section acquires, from the terminal device, information concerning a security standard of wireless communication between the terminal device and the external access point, and
the processing section determines the first security standard based on a security standard between the wireless communication section and the external access point and the acquired information concerning the security standard of wireless communication between the terminal device and the external access point.

4. The electronic apparatus according to claim 1, wherein when the wireless communication section receives an execution instruction for a job from the terminal device, the processing section executes the job, and
when the wireless communication section receives, from the terminal device, prior communication before transmission of the execution instruction for the job, the processing section determines whether to switch the communication with the terminal device from the first wireless communication to the second wireless communication.

5. The electronic apparatus according to claim 1, wherein when the wireless communication section receives an execution instruction for a job from the terminal device, the processing section executes the job,
when receiving, from the terminal device, prior communication before transmission of the execution instruction for the job, the wireless communication section transmits, to the terminal device, information concerning the second security standard and information concerning a security standard of wireless communication between the wireless communication section and the external access point, and when receiving, from the terminal device, the request for connection to the internal access point for the second wireless communication, the wireless communication section switches the communication with the terminal device from the first wireless communication to the second wireless communication.

6. The electronic apparatus according to claim 1, wherein the wireless communication section transmits the connection information used for the second wireless communication to the terminal device.

7. The electronic apparatus according to claim 1, wherein, after the communication with the terminal device by the second wireless communication ends, the wireless communication section switches the communication with the terminal device from the second wireless communication to the first wireless communication.

8. The electronic apparatus according to claim 1, wherein, when communication quality of a second wireless communication standard of the second wireless communication is higher compared with communication quality of a first wireless communication standard of the first wireless communication, the wireless communication section switches the communication with the terminal device from the first wireless communication to the second wireless communication.

9. A communication system, comprising:
the electronic apparatus according to claim 1; and
the terminal device.

10. The electronic apparatus according to claim 1, wherein the wireless communication section is corresponding to Wi-Fi protected access (WPA3) as the security standard and at least one of the other security standard.

11. A communication method by an electronic apparatus and a terminal device that perform communication according to one of first wireless communication through an external access point and second wireless communication, which is direct connection, the communication method comprising:

communicating information concerning a second security standard of the second wireless communication using the first wireless communication;
wherein the information concerning the second security standard is acquired from the terminal device, and wherein the acquired information concerning the second security standard is terminal ability information representing a security standard supported by the terminal device;

determining, based on the acquired information, whether to switch the communication between the electronic apparatus and the terminal device from the first wireless communication to the second wireless communication;

when security strength of the second security standard is higher compared with security strength of a first security standard of the first wireless communication, switching the communication between the electronic apparatus and the terminal device from the first wireless communication to the second wireless communication, wherein
a wireless communication section of the electronic apparatus operates as an internal access point;

performing, via the wireless communication section, the second wireless communication with the terminal device using the internal access point; and transmitting, the security strength of the second security standard of the second wireless communication is higher compared with the security strength of the first security standard of the first wireless communication, to the terminal device a request for connection change from the first wireless communication to the second wireless communication, wherein the request for connection change includes connection information for connecting to the internal access point.

* * * * *